United States Patent
Qian (10) Patent No.: US 10,205,778 B2
(45) Date of Patent: Feb. 12, 2019

(54) METHOD AND APPARATUS FOR SHARING APPLICATION DATA

(71) Applicant: Sangfor Technologies Company Limited, Shenzhen (CN)

(72) Inventor: Jianxin Qian, Shenzhen (CN)

(73) Assignee: SANGFOR TECHNOLOGIES INC., Shenzhen (CN)

( * ) Notice: Subject to any disclaimer, the term of this patent is extended or adjusted under 35 U.S.C. 154(b) by 182 days.

(21) Appl. No.: 14/997,275

(22) Filed: Jan. 15, 2016

(65) Prior Publication Data

US 2016/0212209 A1  Jul. 21, 2016

(30) Foreign Application Priority Data

Jan. 16, 2015 (CN) .......................... 2015 1 0023548

(51) Int. Cl.
*H04L 29/08* (2006.01)

(52) U.S. Cl.
CPC ........ *H04L 67/1095* (2013.01); *H04L 67/141* (2013.01)

(58) Field of Classification Search
None
See application file for complete search history.

(56) References Cited

U.S. PATENT DOCUMENTS

| | | | | |
|---|---|---|---|---|
| 2005/0227678 A1* | 10/2005 | Agrawal | ............... | H04L 12/585 455/414.3 |
| 2010/0312817 A1* | 12/2010 | Steakley | ................... | G06F 8/61 709/202 |
| 2015/0271263 A1* | 9/2015 | Liu | ................... | G06F 17/30861 707/722 |
| 2015/0304413 A1* | 10/2015 | Park | ...................... | H04L 65/403 709/204 |

* cited by examiner

*Primary Examiner* — Azizul Choudhury
(74) *Attorney, Agent, or Firm* — Anova Law Group, PLLC (57) ABSTRACT

A method for sharing application data includes sending a sharing request to a server by a first terminal for sharing application data to be shared from a first application; receiving a user information list and an application list returned by the server; from the user information list, selecting a user identification for receiving the application data to be shared; from the application list, selecting an application identification, for receiving the application data to be shared; and sending the application data to be shared to a second terminal based on the user identification and the application identification, such that the application data to be shared is received and displayed by the second terminal through a second application corresponding to the application identification.

20 Claims, 6 Drawing Sheets

METHOD AND APPARATUS FOR SHARING APPLICATION DATA

CROSS-REFERENCES TO RELATED APPLICATIONS

This application claims priority of Chinese Patent Application No. 201510023548.2, filed on Jan. 16, 2015, the entire contents of which are hereby incorporated by reference.

FIELD OF THE INVENTION

The present disclosure generally relates to the field of computer technologies and, more particularly, relates to methods and apparatuses for sharing application data.

BACKGROUND

With the development of mobile Internet and the rapid improvement of the hardware performance of handheld devices, more and more PC applications appear on mobile terminals. Mobile applications have been favored by users since the beginning. Under the backdrop of the rapid development of mobile applications, several emerging aspects need to be taken into consideration, such as how to provide more efficient and more secure user experience, as well as how to achieve seamless data sharing between different handheld terminals, different mobile devices, and different application programs (Apps, or applications). An App (or an application) mainly refers to an application program running on a mobile terminal platform, and application data refer to the data of an App (or application) running on a mobile terminal platform. Mobile terminals refer to smart phones, tablet computers, personal digital assistants, and other embedded devices. The system running environment for an App mainly includes IOS and Android.

On a mobile terminal platform, for safety considerations, each App runs in its separate and independent sandbox. It is difficult to the achieve data sharing among different Apps on a same terminal, let alone the data sharing among different Apps on different terminals. Currently, it is almost impossible to achieve data sharing among mobile terminals running iOS operating systems. Therefore, under the current security scheme of mobile terminals, it is almost impossible to achieve secure mutual data access among different Apps on different terminals. For example, to share a financial statement in an email App on mobile terminal A to an enterprise OA App on mobile terminal B, under a normal situation, it is necessary to copy the financial statement from the email App on the mobile terminal A, and then copy the financial statement to the OA App on the mobile terminal B. This series of copying operations are extremely cumbersome and complex. Further, if sensitive data are involved, manually copying may cause great data security risks.

The disclosed methods and apparatuses are directed to solve one or more problems set forth above and other problems in the art.

BRIEF SUMMARY OF THE DISCLOSURE

One aspect of the present disclosure includes a method for sharing application data. The methods includes sending a sharing request to a server by a first terminal for sharing application data to be shared from a first application; receiving a user information list and an application list returned by the server; from the user information list, selecting a user identification for receiving the application data to be shared; from the application list, selecting an application identification, for receiving the application data to be shared; and sending the application data to be shared to a second terminal based on the user identification and the application identification, such that the application data to be shared is received and displayed by the second terminal through a second application corresponding to the application identification.

Another aspect of the present disclosure includes an apparatus for sharing application data. The apparatus includes a transmitting module, an acquisition module, and a sharing module. The transmitting module is configured to transmit a sharing request to a server for sharing application data to be shared from a first application. The acquisition module is configured to receive the user information list and the application list returned from the server, and select the user identification for receiving the application data to be shared from the user information list, and the application identification for receiving the application data to be shared from the application list. The sharing module is configured to transmit the application data to be shared to the destination terminal according to the user identification and the application identification, so as to display the application data to be shared through the second application corresponding to the application identification.

Another aspect of the present disclosure includes a non-transitory computer-readable medium having computer program. When being executed by a processor, the computer program performs a method for sharing application data. The methods includes sending a sharing request to a server by a first terminal for sharing application data to be shared from a first application; receiving a user information list and an application list returned by the server; from the user information list, selecting a user identification for receiving the application data to be shared; from the application list, selecting an application identification, for receiving the application data to be shared; and sending the application data to be shared to a second terminal based on the user identification and the application identification, such that the application data to be shared is received and displayed by the second terminal through a second application corresponding to the application identification.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

To make the objectives, technical solutions and advantages of the present invention more clear and explicit, the present invention is described in further detail with accompanying drawings and embodiments. It should be understood that the specific exemplary embodiments described herein are only for explaining the present invention and are not intended to limit the present invention.

Reference will now be made in detail to exemplary embodiments of the disclosure, which are illustrated in the accompanying drawings. Wherever possible, the same reference numbers will be used throughout the drawings to refer to the same or like parts.

Figure 10:
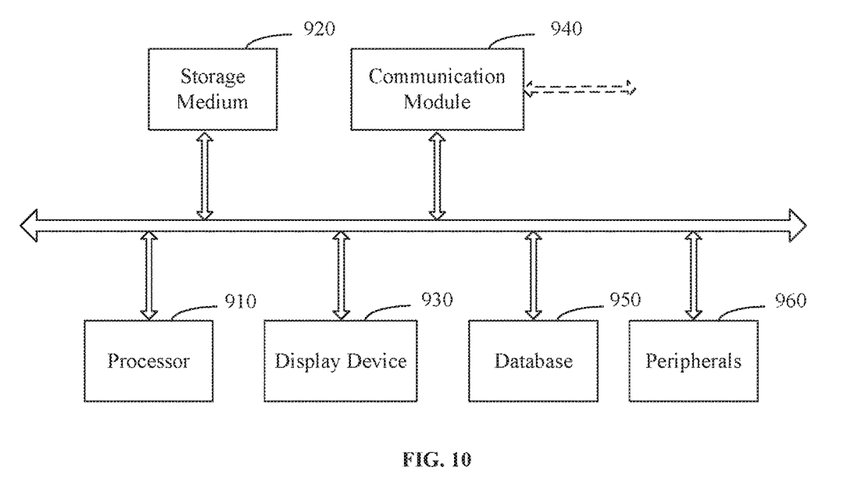
FIG. 10 illustrates an exemplary computing system consistent with the disclosed embodiments.

FIG. 10 illustrates an exemplary computing system that may be used to implement methods and apparatuses for sharing application data consistent with the disclosed embodiments. The computing system may be a smart phone, a tablet computer, a personal digital assistant, and another embedded device. As shown in FIG. 10, the computing system may include a processor 910, a storage medium 920, a display device 930, a communication module 940, a database 950, and peripherals 960. Certain devices may be omitted and other devices may be included.

Processor 910 may include any appropriate processor or processors. Further, processor 910 can include multiple cores for multi-thread or parallel processing. Storage medium 920 may include memory modules, such as ROM, RAM, flash memory modules, and erasable and rewritable memory, and mass storages, such as CD-ROM, U-disk, and hard disk, etc. Storage medium 920 may store computer programs for implementing various processes, when executed by processor 910.

Further, peripherals 960 may include I/O devices such as keyboard and mouse, and communication module 940 may include network devices for establishing connections through the communication network. Database 950 may include one or more databases for storing certain data and for performing certain operations on the stored data, such as database searching.

Figure 1:
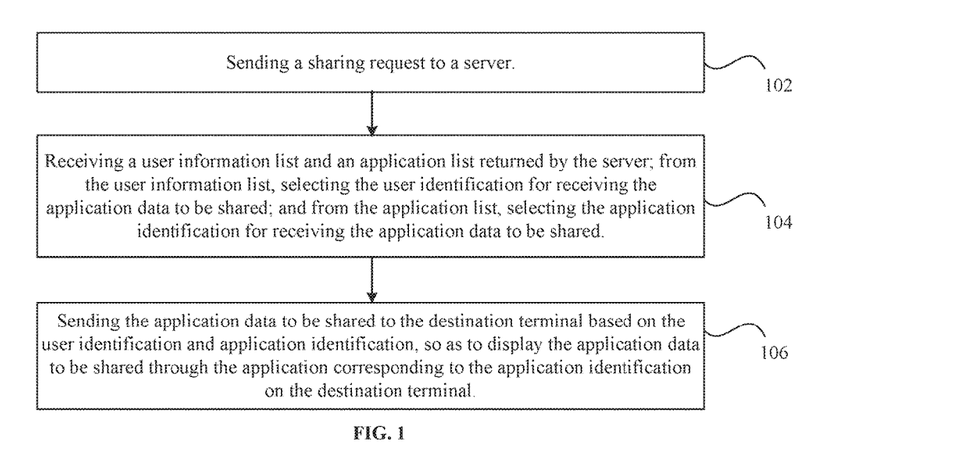
FIG. 1 illustrates a flow chart of an exemplary method for sharing application data consistent with the disclosed embodiments.

In operation, computer system 900 or processor 920 may perform certain processes for data sharing among different applications on a mobile terminal or on different mobile terminals. FIG. 1 illustrates an exemplary application data sharing process, in which a terminal may act as a sender. The terminal may include any appropriate type of mobile terminal that can run applications, such as a smart phone, a tablet computer, a personal digital assistant, etc. As shown in FIG. 1, the application data sharing process may include following steps.

Step 102: sending a sharing request to a server. More specifically, a sharing function may be injected in advance into an application corresponding to the application data to be shared. An application injected with a sharing function (either a sharing application or a receiving application) may have an application sharing page, a user information list display page, and an application list display page, etc. The sharing application can choose the application data to be shared with another terminal or another application through the application sharing page. After receiving the application data selected by a user of the sharing application on the sharing terminal, the sharing application generates a sharing request and sends the sharing request to the server.

Step 104: receiving a user information list and an application list returned by the server; from the user information list, selecting the user identification for receiving the application data to be shared; and from the application list, selecting the application identification for receiving the application data to be shared.

The registered user identifications and corresponding application identifications are stored in the server in advance. A user identification may correspond to multiple application identifications, and the applications corresponding to these application identifications are the applications already injected with sharing functions. A user identification may be a terminal device number, an instant communication number, a user account in an application, etc. An application identification may be an application name. The data type(s) corresponding to the application identification are also stored in the server in advance, indicating the data formats supported by the application.

Specifically, after receiving a sharing request sent by a terminal, the server first gets all the registered user identifications stored in the server, and obtains the user information corresponding to the user identifications. The server then generates a user information list containing the user identifications and the user information, and returns user information list to the sharing terminal. The sharing terminal may select the user identification for receiving the application data to be shared.

After receiving the user identification selected by the sharing terminal, the server locates the corresponding application identification based on the user identification, and generates an application list, and returns it to the terminal. The sharing terminal then selects through the application list the application identification for receiving the application data to be shared. The server then receives the application identification selected by the sharing terminal.

Step 106: sending the application data to be shared to the destination terminal based on the user identification and application identification, so as to display the application data to be shared through the application corresponding to the application identification on the destination terminal. The destination terminal may be different from the sharing terminal, or the destination terminal may be the same as the sharing terminal.

Specifically, the sharing terminal may first generate a data packet containing the selected user identification, the application identification and the application data to be shared, and send the data package to the server. The server then locates the destination terminal based on the user identification and application identification, and forwards the application data to be shared to the destination terminal. As a receiver, the destination terminal receives the application data to be shared, and starts the application corresponding to the application identification to display the application data to be shared.

In addition, if data can be directly transmitted between a sender (e.g., the sharing terminal) and a receiver (e.g., the destination terminal), for example, the sender and the receiver are in a same local area network, the sender may directly send the application data to be shared to the receiver based on the user identification and application identification. After receiving the application data to be shared, the receiver starts the application corresponding to the application identification to display the application data to be shared.

Accordingly, the sharing terminal sends a request to the server, receives the user information list and the application list returned by the server. The sharing terminal selects the user identification for receiving the application data to be shared from the user information list, and selects from the application list the application identification that can display the application data to be shared. Based on the selected user identification and application identification, the sharing terminal shares the application data to be shared to another terminal. The data sharing among different terminals and/or different applications is thus achieved, without external storage devices, and in a more convenient and more secure way.

In one embodiment, the sharing request may also include the data types of the application data to be shared. As shown FIG. 2, Step 104 may further include following steps.

Figure 2:
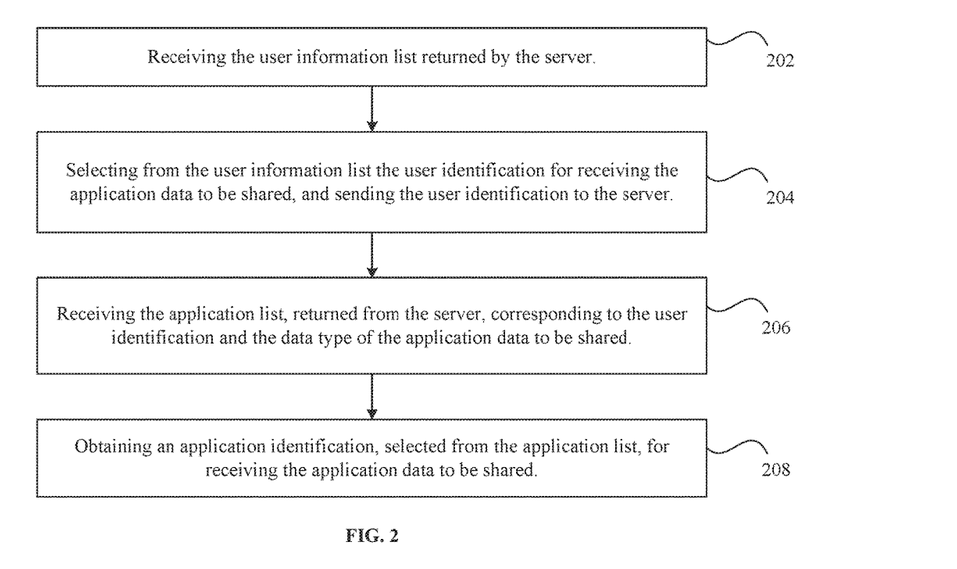
FIG. 2 illustrates a flow chart of an exemplary application for selecting and receiving application data to be shared consistent with the disclosed embodiments.

Step 202: receiving the user information list returned by the server. The user information list may contain all the registered user identifications stored in the server, and the application identifications corresponding to these user identifications can accept shared application data. The user information list returned by the server and received by the sharing terminal may be displayed at the user information list page.

Step 204: selecting from the user information list the user identification for receiving the application data to be shared, and sending the user identification to the server. For example, the sharing terminal obtains the user identification selected from the user information list page by the user or automatically. The terminal corresponding to the selected user identification receives the application data to be shared.

Step 206: receiving the application list, returned from the server, corresponding to the user identification and the data type of the application data to be shared.

Specifically, data types corresponding to an application identification are stored in the server, indicating the data types supported by the application corresponding to the application identification. The server receives the user identification, and selects, from a stored applications list corresponding to the user identification, the applications whose corresponding data types match the data type of the sharing request. The server then generates an application list and returns the application list to the sharing terminal.

Step 208: obtaining an application identification, selected from the application list, for receiving the application data to be shared. That is, after receiving the application list, the sharing terminal, as a sender, may display the application list at the application list page. A user may select, from the application list page, the application for receiving the application data to be shared.

The sharing terminal then sends the selected application identification to the server or to the destination terminal, as a receiver, corresponding to user identification. Further, the sender (the sharing terminal) may upload the application identification, user identification and application data to be shared to the server, and the server may forward the data to be shared to the receiver (the destination terminal). If data can be directly transmitted from the sender to the receiver, the sender may also directly send the application identification, user identification and application data to be shared to the receiver.

Further, Step 106 may further include: generating the sharing information of the application data to be shared, and pushing the sharing information to the destination terminal based on the user identification and the application identification; receiving an instruction from the destination terminal for confirming the receiving of the contents to be shared, and according to the instruction confirming the receiving of the contents to be shared, sending the application data to be shared to the destination terminal, so as to display the application data to be shared through the application corresponding to the application identification on the destination terminal.

In this embodiment, the sender generates the sharing information of the application data to be shared, and sends the sharing information, together with the user identification and the application identification, to the server. The server pushes the sharing information to the receiver according to the user identification and the application identification. The receiver receives the sharing information, and displays the sharing information through the application corresponding to the application identification, and provides a control component for the user to confirm the receiving of the sharing contents. The receiver further receives the instruction from the user confirming the receiving of the sharing contents based on the control component, and submits the instruction confirming the receiving of the sharing contents to the server. After receiving the instruction confirming the receiving of the sharing contents, the server sends the application data to be shared to the receiver, and the application data are then displayed through the application corresponding to the application identification in the receiver.

Further, the data amount of the sharing information may be less than the data amount of the application data to be shared. The application data to be shared is sent after the receiver confirms the receiving of the sharing contents and, thus, unnecessary data transmission is avoided, saving network resources.

Further, before the step sending the sharing request to the server, the process may further include: sending a request for injecting a sharing function of an application to the server; and receiving and installing the application injected with a sharing function returned by the server.

That is, the application for sharing data and the application for receiving the data to be shared may both be performed with an application injection in advance. An application injection may refer to the action of packaging an application program, modifying the installed binary program such that some new functions and properties may be added to the modified installed program, and modifying part of the functions. As used herein, the application injection may refer to the modification of an application program installed on a mobile terminal, such that those applications originally do not support the sharing function may now have the function to mutually share application data between different terminals and/or between different applications.

Figure 3:
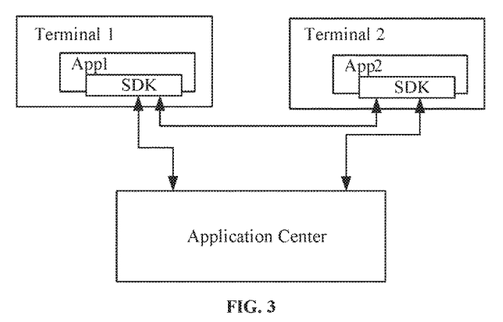
FIG. 3 illustrates a schematic chart of injecting a sharing function to an application consistent with the disclosed embodiments.

In one embodiment, the injection of a sharing function to an application may be achieved through a software development kit (SDK), wherein the SDK refers to a software development kit supporting the sharing function. Specifically, as shown in FIG. 3, a terminal may select an application and submit a request for injecting a sharing feature of the application, and submit the installation package corresponding to the application to an application center (i.e., the server). The application center then add an SDK program with a sharing function to the original application program, so as to make the original application program have the sharing function. The installation package of the application added with the SDK program is then returned back to the terminal and installed in the terminal.

Further, after receiving and installing an application injected with a sharing function returned by the server, the process may further include: starting the application injected with a sharing function; sending the user identification, application identification of the application, and the data type supported by the application to the server for corresponding storage.

When the server adds an SDK with a sharing function to the original application program, the server may save the address information of the server, information type supported by the application, and other information in the application program. After the application added with SDK is installed and started, by logging into the application, a user may initiate a registration request to the server based on the address information of the server, and submit the user identification, the application identification, the data type supported by the application and other information to the server for corresponding storage, so as to get the application registered. An application after registration may share data and receive the application data shared by other applications in other terminals.

Figure 4:
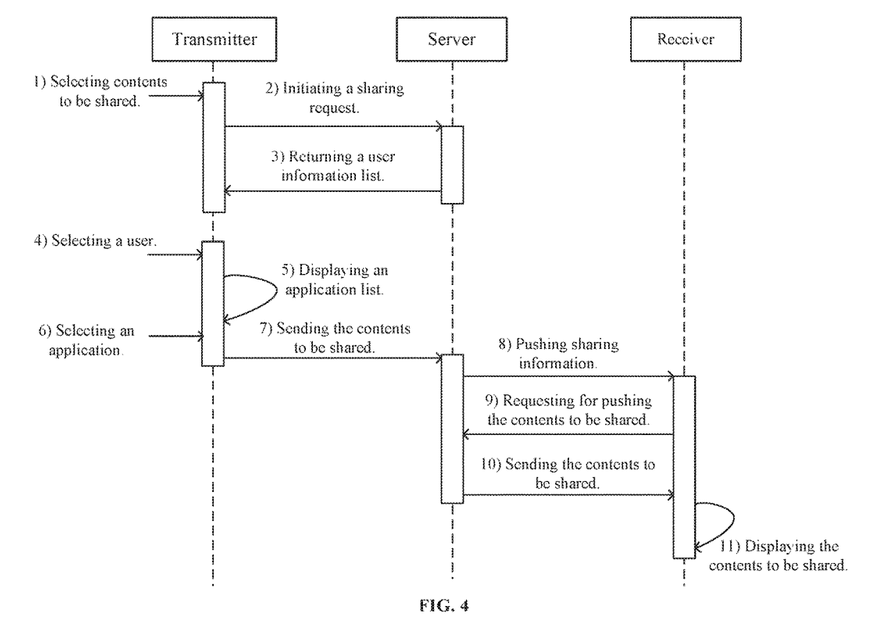
FIG. 4 illustrates a sequence diagram of an exemplary method for sharing application data consistent with the disclosed embodiments.

FIG. 4 illustrates a timing diagram of an exemplary method for sharing application data. As shown in FIG. 4, the procedure of sharing application data comprises following steps involving a transmitter, a receiver and a server.

Figure 5A:
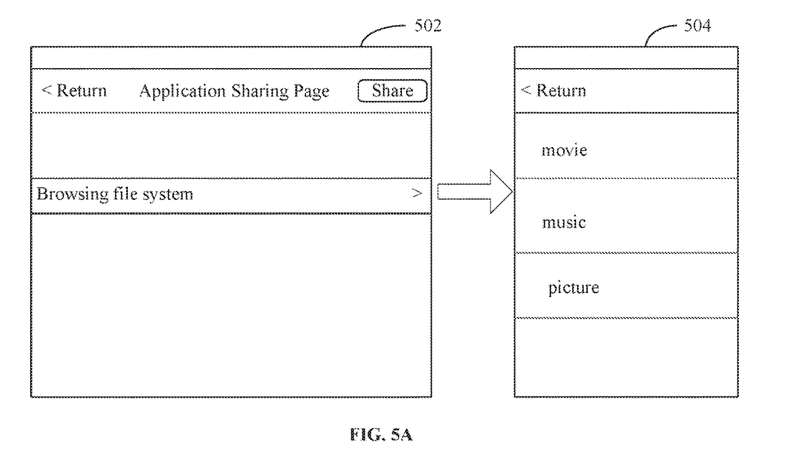
FIG. 5A illustrates an exemplary interface for selecting the application data to be shared, consistent with the disclosed embodiments.

Step 1): the sender selects the application data to be shared through the application sharing page. As shown in FIG. 5A, for an application with application data to be shared, a user may enter the application sharing page 502 and select the file system of the application; and further, the user may enter the data selection page 504 and select the application data to be shared.

Step 2): the sender initiates a sharing request to the server.

Step 3): the server returns a user information list to the sender. As described above, the users in the user information list are the users whose applications are added with sharing functions and successfully registered to the server.

Step 4): the sender selects a user through the user information list page.

Figure 5B:
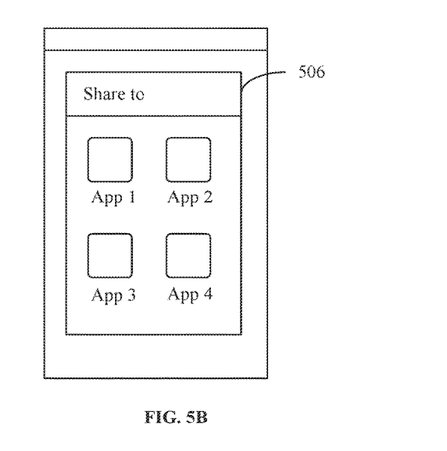
FIG. 5B illustrates an exemplary interface for selecting and receiving the application to be shared, consistent with the disclosed embodiments.

Step 5): the sender obtains the application identification corresponding to the user identification, and displays the application list. FIG. 5B shows an exemplary application list page 506 of an embodiment.

Step 6): the sender selects an application through the application list page. For example, the user select one or more of App 1, App 2, App 3, and App 4 listed on the application list page.

Step 7): the sender sends the application identification, user identification and application data to be shared to the server.

Step 8): the server generates sharing information and pushes the sharing information to the receiver.

Step 9): the receiver receives the sharing information, and send the instruction for confirming the receiving of the sharing contents to the server.

Step 10): after receiving the instruction for confirming the receiving of the sharing contents, the server sends the application data to be shared to the receiver.

Step 11): the receiver receives the application data, and starts the application corresponding to the application identification to display the application data to be shared.

The sender and the receiver may be different terminals, and the application on the sender for sharing data and the application on the receiver for receiving the shared data may be different types of applications, provided that they can support the data format of the application data to be shared.

Figure 6:
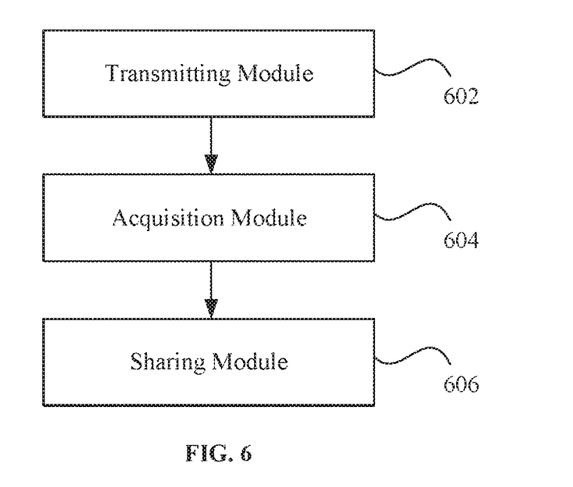
FIG. 6 illustrates an exemplary apparatus for sharing application data consistent with the disclosed embodiments.

FIG. 6 illustrates an exemplary apparatus for sharing application data. The apparatus comprises a transmitting module 602, an acquisition module 604, and a sharing module 606.

The transmitting module 602 is configured to transmit a sharing request to a server. The acquisition module 604 is configured to receive the user information list and the application list returned from the server, and select the user identification for receiving the application data to be shared from the user information list, and the application identification for receiving the application data to be shared from the application list.

The sharing module 606 is configured to transmit the application data to be shared to the destination terminal according to the user identification and the application identification, so as to display the application data to be shared through the application corresponding to the application identification on the destination terminal.

Figure 7:
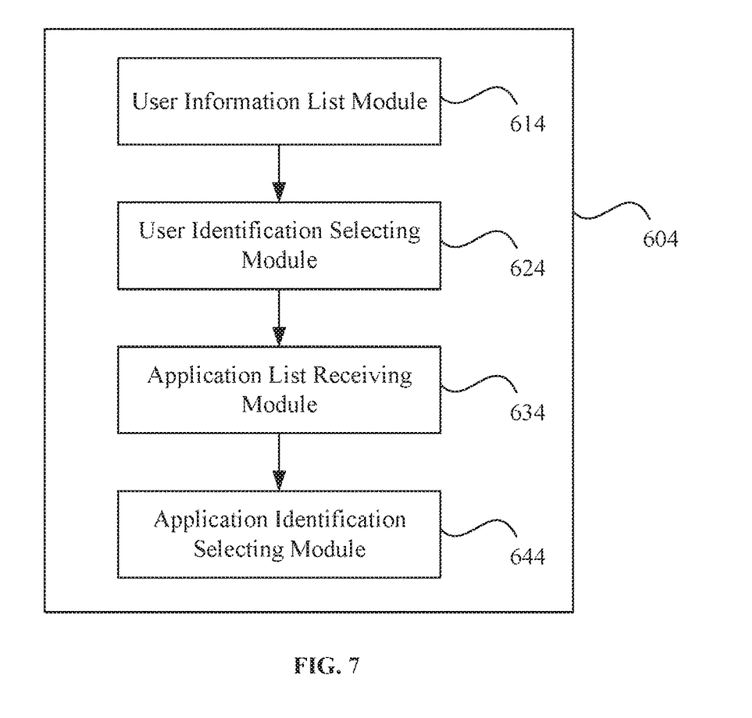
FIG. 7 illustrates an exemplary acquisition module consistent with the disclosed embodiments.

A sharing request may contain the data type of the application data to be shared. As shown in FIG. 7, the acquisition module 604 includes a user information list module 614, a user identification selecting module 624, an application list receiving module 634, and an application identification selecting module 644.

The user information list receiving module 614 is configured to receive the user information list returned by the server. The user identification selecting module 624 is configured to select the user identification for receiving the application data to be shared from the user information list, and send the user identification to the server.

The application list receiving module 634 is configured to receive the application list, returned by the server, corresponding to the user identification and the data type of the application data to be shared. The application identification selecting module 644 is configured to select, from the application list, the application identification for receiving the application data to be shared.

Figure 8:
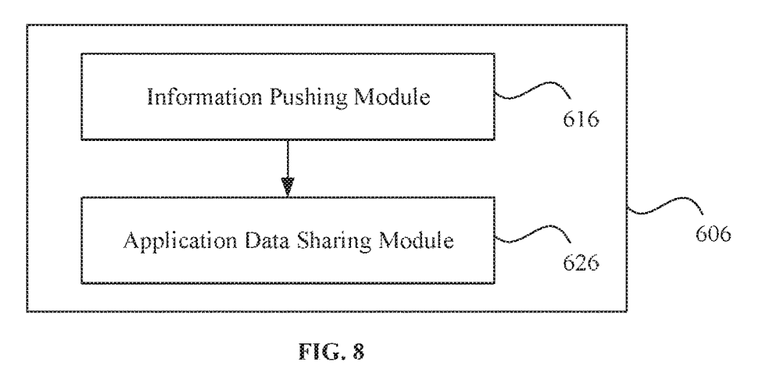
FIG. 8 illustrates an exemplary sharing module consistent with the disclosed embodiments.

As shown in FIG. 8, the sharing module 606 may comprise an information pushing module 616 and an application data sharing module 626.

The information pushing module 616 is configured to generate the sharing information of the application data to be shared, and push the sharing information to the destination terminal according to the user identification and the application identification.

The application data sharing module 626 is configured to receive the instruction sent by the destination terminal for confirming the receiving of the sharing contents, and based on the instruction for confirming the receiving of the sharing content, transmit the application data to be shared to the destination terminal, so as to display the application data to be shared through the application corresponding to the application identification on the destination terminal.

Figure 9:
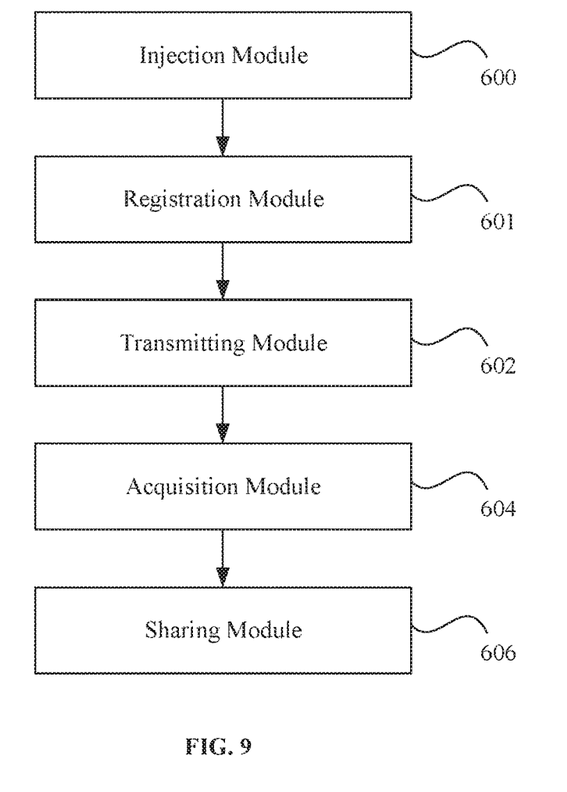
FIG. 9 illustrates another exemplary apparatus for sharing application data consistent with the disclosed embodiments.

As shown in FIG. 9, the application data sharing apparatus may further comprise an injection module 600 and a registration module 601.

The injection module 600 is configured to send a request for injecting a sharing function of an application to a server, and receive and install the application injected with the sharing function returned from the server.

The registration module 601 is configured to start the application injected with the sharing function, and send the user identification, the application identification, and the data types supported by the application to the server for corresponding registration.

The embodiments disclosed herein are exemplary only and not limiting the scope of this disclosure. Various alternations, modifications, or equivalents to the technical solutions of the disclosed embodiments can be obvious to those skilled in the art and can be included in this disclosure. Without departing from the spirit and scope of this invention, such other modifications, equivalents, or improvements to the disclosed embodiments are intended to be encompassed within the scope of the present disclosure.

What is claimed is:

1. A method for sharing application data performed by computer programs executable by a processor of a first terminal, the method comprising:
    choosing, by the first terminal running a first application, application data through an application sharing page of the first application displayed at an interface of the first terminal, wherein the application data is contents to be shared with a second terminal;
    generating, by the first terminal, a sharing request for sharing the application data with the second terminal;
    sending, by the first terminal, the sharing request to a server for sharing the application data to be shared from the first application;
    receiving, by the first terminal, a user information list and an application list returned by the server;
    from the user information list, selecting, by the first terminal, a user identification for receiving the application data to be shared;
    from the application list, selecting, by the first terminal, an application identification for receiving the application data to be shared; and
    sending, by the first terminal, the application data to be shared to the second terminal based on the user identification and the application identification, such that the application data to be shared is received and displayed by the second terminal through a second application corresponding to the application identification, wherein:
    the second application running on the second terminal, for displaying the application data to be shared, is different from the first application running on the first terminal,
    the user information list includes a plurality of user identifications for display at a user information list page of the first terminal, and
    the application list includes a plurality of application identifications for display at an application list page of the first terminal.

2. The method according to claim 1, wherein the sharing request includes a data type of the application data to be shared and the first terminal and the second terminal are a same terminal.

3. The method according to claim 1, wherein receiving, by the first terminal, a user information list and an application list returned by the server; from the user information list, selecting, by the first terminal, a user identification for receiving the application data to be shared; and from the application list, selecting, by the first terminal, an application identification for receiving the application data to be shared further includes:
    receiving, by the first terminal, the user information list returned by the server;
    selecting, by the first terminal, the user identification for receiving the application data to be shared from the user information list;
    sending, by the first terminal, the user identification to the server;
    receiving, by the first terminal, the application list returned from the server that corresponds to the user identification and a data type of the application data to be shared; and
    selecting, by the first terminal, the application identification for receiving the application data to be shared from the application list.

4. The method according to claim 1, wherein sending, by the first terminal, the application data to be shared to the second terminal based on the user identification and the application identification, such that the application data to be shared is received and displayed by the second terminal through a second application corresponding to the application identification further includes:
    generating, by the first terminal, sharing information of the application data to be shared, and pushing, by the first terminal, the sharing information to the second terminal based on the user identification and the application identification;
    receiving, by the first terminal or the server, an instruction sent by the second terminal of that confirms to receive the contents to be shared; and
    according to the instruction that confirms to receive the contents to be shared, sending, by the first terminal, the application data to be shared to the second terminal, such that the application data to be shared is received and displayed by the second terminal through the second application corresponding to the application identification.

5. The method according to claim 1, before sending, by the first terminal, the sharing request to a server, further including:
    injecting a sharing function through a software development kit (SDK) in both the first application on the first terminal and the second application on the second terminal; and
    registering the first application and the second application on the server.

6. The method according to claim 5, wherein injecting a sharing function of the first application further includes:
    sending, by the first terminal, a request for injecting the sharing function of the first application to the server through the SDK that supports the sharing function;
    adding, by the server, an SDK program with the sharing function to an installation package of the first application;
    receiving, by the first terminal, the installation package of the first application added with the SDK program from the server; and
    installing, by the first terminal, the first application injected with the sharing function.

7. The method according to claim 6, after installing, by the first terminal, the first application injected with the sharing function, further including:
    starting the first application injected with the sharing function; and
    sending a user identification of the first application, an application identification of the first application, and a data type supported by the first application to the server for corresponding storage.

8. An apparatus for sharing application data, comprising:
a storage medium for storing computer programs; and
a processor, coupled with the storage medium and, when executing the computer programs, configured to:
- transmit a sharing request to a server for sharing application data to be shared from a first application running on the apparatus;
- receive a user information list and an application list returned from the server, and select a user identification for receiving the application data to be shared from the user information list and an application identification for receiving the application data to be shared from the application list; and
- transmit the application data to be shared to a destination terminal according to the user identification and the application identification, so as to display the application data to be shared through a second application corresponding to the application identification on the destination terminal;

wherein the application data is contents to be shared with the destination terminal chosen by the apparatus through an application sharing page displayed at an interface of the apparatus, the second application running on the second terminal, for displaying the application data to be shared, is different from the first application running on the first terminal, the user information list includes a plurality of user identifications for display at a user information list page of the apparatus, and the application list includes a plurality of application identifications for display at an application list page of the apparatus.

9. The apparatus according to claim 8, wherein the sharing request includes a data type of the application data to be shared and the first terminal and the second terminal are a same terminal.

10. The apparatus according to claim 8, wherein the processor is further configured to:
- receive the user information list returned by the server;
- select, from the user information list, the user identification for receiving the application data to be shared, and send the user identification to the server;
- receive the application list returned by the server that corresponds to the user identification and a data type of the application data to be shared; and
- select, from the application list, the application identification for receiving the application data to be shared.

11. The apparatus according to claim 8, wherein the processor is further configured to:
- generate sharing information of the application data to be shared, and push the sharing information to the destination terminal according to the user identification and the application identification; and
- receive an instruction sent by the destination terminal that confirms to receive the contents to be shared, and based on the instruction that confirms to receive the contents to be shared, transmit the application data to be shared to the destination terminal, so as to display the application data to be shared through the second application corresponding to the application identification on the destination terminal.

12. The apparatus according to claim 8, wherein the processor is further configured to:
- send a request for injecting a sharing function of the first application to the server through a software development kit (SDK) that supports the sharing function, and receive an installation package of the first application added with an SDK program from the server to install the first application injected with the sharing function.

13. The apparatus according to claim 8, wherein the processor is further configured to:
- start the first application injected with the sharing function, and send a user identification of the first application, an application identification of the first application, and data types supported by the first application to the server for corresponding storage.

14. A non-transitory computer-readable medium having computer program for, when being executed by a processor, performing a method for sharing application data, the method comprising:
- choosing, by a first terminal running a first application, application data through an application sharing page of the first application displayed at an interface of the first terminal, wherein the application data is contents to be shared with a second terminal;
- generating, by the first application, a sharing request for sharing application data with the second terminal;
- sending, by the first terminal, the sharing request to a server for sharing the application data to be shared from the first application;
- receiving, by the first terminal, a user information list and an application list returned by the server;
- from the user information list, selecting, by the first terminal, a user identification for receiving the application data to be shared;
- from the application list, selecting, by the first terminal, an application identification for receiving the application data to be shared; and
- sending, by the first terminal, the application data to be shared to the second terminal based on the user identification and application identification, such that the application data to be shared is received and displayed by the second terminal through a second application corresponding to the application identification, wherein:

the second application running on the second terminal, for displaying the application data to be shared, is different from the first application running on the first terminal, the user information list includes a plurality of user identifications for display at a user information list page of the first terminal, and the application list includes a plurality of application identifications for display at an application list page of the first terminal.

15. The non-transitory computer-readable medium according to claim 14, wherein the sharing request includes a data type of the application data to be shared and the first terminal and the second terminal are a same terminal.

16. The non-transitory computer-readable medium according to claim 14, wherein receiving, by the first terminal, a user information list and an application list returned by the server; from the user information list, selecting, by the first terminal, a user identification for receiving the application data to be shared; and from the application list, selecting, by the first terminal, an application identification for receiving the application data to be shared further includes:
- receiving, by the first terminal, the user information list returned by the server;
- selecting, by the first terminal, the user identification for receiving the application data to be shared from the user information list;
- sending, by the first terminal, the user identification to the server;

receiving, by the first terminal, the application list returned from the server that corresponds to the user identification and a data type of the application data to be shared; and selecting, by the first terminal, the application identification for receiving the application data to be shared from the application list.

17. The non-transitory computer-readable medium according to claim 14, wherein sending, by the first terminal, the application data to be shared to the second terminal based on the user identification and the application identification, such that the application data to be shared is received and displayed by the second terminal through a second application corresponding to the application identification further includes:

generating, by the first terminal, sharing information of the application data to be shared, and pushing, by the first terminal, the sharing information to the second terminal based on the user identification and the application identification;

receiving, by the first terminal or the server, an instruction sent by the second terminal that confirms to receive the contents to be shared; and according to the instruction-that confirms to receive the contents to be shared, sending, by the first terminal, the application data to be shared to the second terminal, such that the application data to be shared is received and displayed by the second terminal through the second application corresponding to the application identification.

18. The non-transitory computer-readable medium according to claim 14, before sending, by the first terminal, the sharing request to a server, further including:

injecting a sharing function in both the first application on the first terminal and the second application on the second terminal; and registering the first application and the second application on the server.

19. The non-transitory computer-readable medium according to claim 18, wherein injecting a sharing function of the first application further includes:

sending, by the first terminal, a request for injecting the sharing function of the first application to the server through a software development kit (SDK) that supports the sharing function;

adding, by the server, an SDK program with the sharing function to an installation package of the first application;

receiving, by the first terminal, the installation package for the first application added with the SDK program returned by the server; and installing, by the first terminal, the first application injected with the sharing function.

20. The non-transitory computer-readable medium according to claim 19, after installing, by the first terminal, the first application injected with the sharing function, further including:

starting the first application injected with the sharing function; and sending a user identification of the first application, an application identification of the first application, and a data type supported by the first application to the server for corresponding storage.

\* \* \* \* \*